United States Patent [19]
Davis et al.

[11] Patent Number: 5,371,588
[45] Date of Patent: Dec. 6, 1994

[54] SURFACE PROFILE AND MATERIAL MAPPER USING A DRIVER TO DISPLACE THE SAMPLE IN X-Y-Z DIRECTIONS

[75] Inventors: Christopher C. Davis, Bowie; David L. Mazzoni, Baltimore, both of Md.; Kyman Cho, Seoul, Rep. of Korea

[73] Assignee: University of Maryland, College Park, College Park, Md.

[21] Appl. No.: 150,707

[22] Filed: Nov. 10, 1993

[51] Int. Cl.$^5$ .............................................. G01B 9/02
[52] U.S. Cl. .................................... 356/349; 356/359
[58] Field of Search ............... 356/345, 349, 351, 359, 356/360, 358

[56] References Cited
U.S. PATENT DOCUMENTS
4,995,726 2/1991 Fujita et al. ....................... 356/359

*Primary Examiner*—Samuel A. Turner
*Assistant Examiner*—Robert Kim
*Attorney, Agent, or Firm*—Christopher N. Sears

[57] ABSTRACT

The invention uses a heterodyne interferometer with coherent detection that uses a vibrating sample that can be used as a non-contact and non-destructive surface profiler and mapping apparatus where detailed profiles of the local slope and/or roughness of the vibrating sample are obtained in three dimensions. The invention can operate in either a heterodyne or homodyne regime with a probe that uses either i) focused optics, ii) a single mode optical fiber with an integral GRIN lens at its far end for focusing onto the sample or iii) a single-mode optical fiber with a taper at the end. Additionally, the heterodyne interferometry technique can be used for imaging birefringent objects such as semiconductor diagnostics of GaAs, InGaAs, InGaAsP, and other II-VI of III-V binary, ternary, and quaternary materials for analysis and diagnostics by using the birefringent properties of the object, and monitoring the electrical activity of biological cellular tissue.

24 Claims, 10 Drawing Sheets

SURFACE PROFILE AND MATERIAL MAPPER USING A DRIVER TO DISPLACE THE SAMPLE IN X-Y-Z DIRECTIONS

STATEMENT OF GOVERNMENT INTEREST

The invention described herein may be manufactured and used by or for the Government of the United States of America for governmental purposes without the payment of any royalties thereon pursuant to a grant by the US Army through contract DAMD 17-90-Z-052 and supported by the Department of Defense through Contract MDA904-91-C-9320.

FIELD OF THE INVENTION

This invention pertains to a heterodyne interferometer technique using a vibrating or electrically excited sample under examination for analyzing surface characteristics of the sample. This invention provides a means for obtaining a detailed surface profile of a sample's surface by determining the local slope and/or roughness where a complete three dimensional (3-D) image of a surface can be obtained. Additionally, the heterodyne interferometry technique can be used for imaging birefringent objects, measuring the electrical activity of biological cells and providing semiconductor diagnostics of GaAs, InGaAs, InGaAsP, and other II-VI of III-V binary, ternary, and quaternary materials.

Uses include surface profilers for precision optical components such as UV and X-ray optics for lithography or astronomy. Advantages of the instant invention include imaging of biological objects with resolution comparable to a scanning electron microscope, but without having to freeze-dry the samples and coat them with a metal layer, thus allowing examination while the biological object is in the living state. The invention can also be used in imaging and base-pair identification of DNA molecules.

BACKGROUND OF THE INVENTION

There have been several reports of efforts to use interferometric schemes in microscopy. Laser homodyne and heterodyne interferometry can measure extremely small displacement changes. In a scanning microscopy application this should allow detailed mapping of surfaces with ultra-fine depth resolution.

Matthews et al. in *Applied Optics*, 2372 (1986) and T. Suzuki et al. in *Applied Optics*, 3623 (1991) have demonstrated the potential of optical homodyne interferometry in 3-D microscopy. The optical pathlength of the reference arm of the interferometer in these experiments was actively controlled to maintain the interferometer at maximum phase sensitivity. The error signal from a feedback control loop was monitored while scanning the surface to obtain its 3-D structure. Unfortunately, this method is extremely sensitive to environmental disturbances; i.e. any thermal and acoustic change in optical path length of the interferometer arms can disturb the measurement. Huang was able to overcome these difficulties by the use of a double beam heterodyne interferometer with common-mode rejection that allowed a depth resolution of 10 picometers. An optical heterodyne interferometric scheme was proposed by See et al. in *Applied Optics*, p. 2373 (1985). In their experiment the probe beam was periodically displaced at 1.7 MHz and the phase of the probe beam was modulated by depth variations. These depth variations were converted into intensity contrast on a cathode ray tube display. In this way they were able to identify the grain boundaries on a polished stainless steel surface. Although they achieved phase sensitivity close to the photon noise limit, because of the wide noise bandwidth (30 KHz) and small probe power (50 μW), the maximum differential depth resolution obtained was approximately 0.01 nm. Moreover, because the amplitude of the displacement was approximately the size of the focus, the spatial resolution was relatively poor compared to other microscopy techniques. In the instant invention below, a more versatile and high resolution microscopy technique is introduced that uses a true heterodyne interferometry which uses direct phase locked loop RF demodulation that narrows the bandwidth of the measurement, which gives almost two orders of magnitude improvement over the average depth resolution when compared to the concept introduced by See et al. above.

The most pertinent art cited as to the heterodyne interferometry technique of the instant invention includes Fujita et al. U.S. Pat. No. 4,995,726 entitled "Surface Profile Measuring Device Utilizing Optical Heterodyne Interference" and Fujita et al. U.S. Pat. No. 5,061,071 entitled "Method and Apparatus for Detecting Surface Characteristics by Utilizing Optical Heterodyning Interferometry" where the sample being measured, is oscillated by a piezoelectric device in a vertical mode parallel to the optical axis. Differences between the instant invention and these references include the mode of oscillation by the oscillating driver means in a lateral mode versus the vertical mode as taught by the prior art. The instant inventions apparatus and method is much less complex then these prior art references resulting in greater reliability. Moreover, the instant invention uses a geometrical average path-length methodology for determining displacement in the surface which can use a homodyne demodulation technique if required which is not discussed in Fujita et al.

SUMMARY OF THE INVENTION

The present invention provides a versatile and high resolution microscopy technique that uses a heterodyne interferometer as discussed in Cho et al. article in *Optics Letters*, entitled "Hybrid Fiber-optic Sensor Using True Heterodyne Measurement Techniques", Vol. 16, p. 614–16, April 1991. By using direct phase locked loop RF demodulation, a more narrow bandwidth of the measurement gives almost two orders of magnitude improvement in average depth resolution compared to that achieved by See et. al. by applying a small amplitude lateral vibration to the object under test, (typically a few nm at 1 KHz) that allows determination of the local slope of its surface which is a scanning coherent slope microscopy (SCSM) technique.

Light from a single-frequency laser, for example, a He-Ne, diode-pumped Nd:YAG, or semiconductor laser, is divided into two parts at a beam splitter. One of the resulting beams serves as a local oscillator (the homodyne version of the invention) or may be frequency shifted by an acoustic-optic modulator in the heterodyne version of the invention. The beam can be directed at the surface to be probed either i) through a free space assembly of focusing optics, or ii) down a single-mode optical fiber with an integral GRIN lens at its far end for focusing onto the object being examined, or iii) down a single-mode fiber with a taper at its far end that allows evanescent, near-field probing of the object being examined with sub-diffraction-limited resolution. Resolutions on the order of 1 nanometer (nm) with visible or near-infrared laser sources. To reduce loss, the tapered fiber is over coated with metal except for a small (1-10 nm) opening at the tip of the taper. The position of the probe above the surface is servo-controlled based on signal amplitude and phase to carry out ultra-high resolution microscopy of an object. Either the probe is scanned over the surface in a raster scan, or the object is raster scanned under the probe. In addition, the surface being scanned is vibrated with a small amplitude (1-10 nm) in a direction either perpendicular, or lateral, to the direction of the laser light being directed at the surface. This causes a small phase modulation of the back-scattered light from the object under examination. This phase modulated light is mixed with the reference laser beam to produce an intermediate frequency (IF) signal at the heterodyne offset frequency. The IF beam is demodulated further with a discriminator or phase-locked-loop to give a base-band signal containing a signal that is synchronous with the phase modulation at the vibration frequency.

To determine the surface profile, or to carry out ultra-high resolution microscopy of an object, the object is vibrated laterally with an amplitude of 10-100 nm. The lateral vibration causes a Doppler shift of the reflected or back-scattered light that is directly related to the surface shape of the object at the point where the focused laser beam or tapered fiber tip is placed. By vibrating the sample in orthogonal directions at different frequencies, the full 3D shape of the examined surface can be determined by an on-line personal computer processing means of the surface slope profile map.

The use of heterodyne detection in this invention provides a large dynamic range and eliminates phase operating point ambiguity that can occur in the homodyne version.

The use of the homodyne or heterodyne detection is of particular value in the tapered fiber probe version of the invention since these techniques boost the sensitivity for detecting the weak evanescent near-field coupling that occurs in this version of the invention. The single mode optical fiber with a taper at the end for these applications can use Prater et al.'s U.S. Pat. No. 5,166,520 entitled "Universal Microfabricated Probe for Scanning Probe Microscopes" which is hereby incorporated by reference.

The inventions heterodyne interferometry technique can also be used for imaging birefringent objects such as semiconductor diagnostics of GaAs, InGaAs, InGaAsP, and other II-VI of III-V binary, ternary, and quaternary materials. Two orthogonally polarized, frequency spaced laser beams that are mutually coherent can be transmitted along an optical fiber, or through free space to the object being tested or imaged. Additionally, since the membrane of electrically active biological cells are birefringent, this probe can also be used for real-time monitoring of a cells electrical activity in a non-contact and non-invasive way.

OBJECTS OF THE INVENTION

Accordingly, several objects and advantages of the present invention are:

(a) To provide a near field scanning microscope using optical heterodyne or homodyne techniques with a probing means to examine a desired surface that requires a non-contact and non-destructive means to achieve the scan whereby high resolution of the surface is achieved wherein the probing means uses coherent detection to boost the signal to noise ratio of detected signals.

(b) To provide a near field scanning microscope using optical heterodyne or homodyne techniques with a probing means to examine a desired surface that the probing means does not require a conductive or coated sample and can image biological objects in an in-vivo or in-vitro state.

(c) To provide a near field scanning microscope using optical heterodyne techniques with a probing means to examine a desired surface to avoid phase ambiguity and provide a wide dynamic image up to 120 dB by using optical mixing which provides increased spatial resolution for a given focus geometry or tapered tip dimension.

(d) To provide an improved near-field scanning microscope using optical heterodyne or homodyne techniques with a probing means to examine a desired surface that use coherent interferometric techniques to improve signal to noise ratio and enhance resolution.

(e) To provide a sensitive fiber interferometer sensor for remote mapping of elecro-optically induced bifringence in GaAs and other birefringent materials.

(f) To provide a sensitive probe sensor for monitoring the electrical activity of cells through the cells inherent natural birefringent qualities.

Still further advantages will become apparent from a consideration of the ensuing detailed description and drawings.

BRIEF DESCRIPTION OF THE DRAWINGS

FIG. 2 (b) shows a blowup of the surface and the required slope determination technique of that shown in FIG. 2 (a).

DETAILED DESCRIPTION

Local Slope of a Surface Using Heterodyne Interferometry

Figure 1:
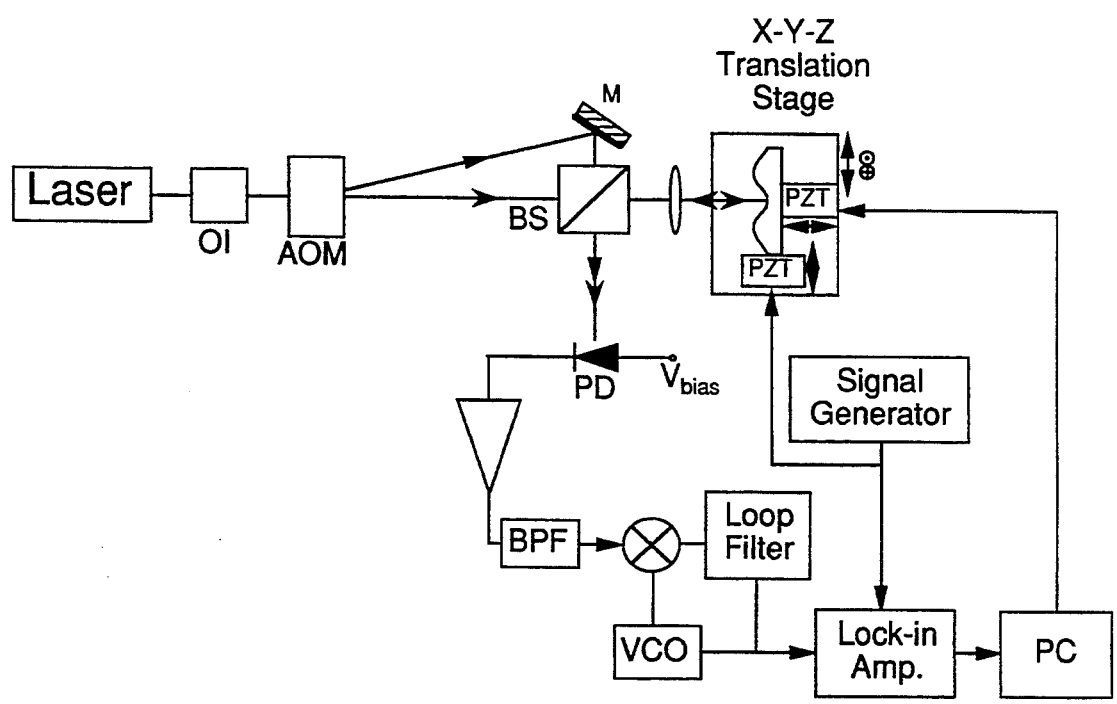
FIG. 1 shows the basic apparatus used to determine the surface characteristics of an object sample.

The basic heterodyne interferometer used in this embodiment of the invention is shown in FIG. 1. In FIG. 1, OI is an optical isolator, AOM is an acousto-optic modulator, BS is a beam splitter, PD is a photodiode detector, BPF is a band pass filter, and VCO is a voltage controlled oscillator. Light from a single frequency laser, a He-Ne laser for example, is split into two paths by an acousto-optic modulator. The deflected beam suffers a 40 MHz or other appropriate frequency shift and is used as the local oscillator of the interferometer. After the beam splitter (BS) the other beam, i.e. the probe beam, is focused onto the surface under test by a 10X microscope objective (N.A. 0.25). The surface is laterally vibrated by an X-Y piezotransducer (PZT) driven stage and can optionally have a Z driven PZT stage such that better position control can result by oscillating the sample perpendicularly to the incident beam of laser light. The amplitude of the displacement is approximately 5 nm. The probe beam is phase modulated by this sinusoidal lateral vibration of the surface. Since the focused beam has a finite size, the modulation depth is determined by the geometrical average of the pathlength (GAPL) over the focused region. The GAPL difference caused by the small amplitude vibration of the surface is a measure of the local slope. The lateral spatial resolution is thereby limited by the focusing optics, because surface roughness smaller than the focal spot is averaged. The reflected scattered beam from the surface is collected by the focusing lens and sent back to the BS. The local oscillator and probe beams are combined in the BS and mixed at the photodiode (PD). The phase modulation on the probe beam is then carried by the RF intermediate frequency. The signal current $i_s$ from the photodiode is:

$$i_s \approx |E_L|^2 + |E_s|^2 + 2|E_L||E_s|\cos(\Delta\omega t + \Delta\Phi) \quad (1)$$

where $\Delta\omega$ is the RF intermediate frequency and $\Delta\Phi$ is the phase difference between the probe and local oscillator beams. The phase term can be rewritten as:

$$\Delta\Phi = \Phi_m + \Phi_s \quad (2)$$

where $\Phi_m$ is the sinusoidally modulated phase term and $\Phi_s$ represents other environmentally induced phase changes caused by thermal drifts of the optical paths and acoustic vibrations of optical components. If the surface is displaced in the x-direction with a small displacement $\delta x = \delta_0 \sin \omega_m t$, the resulting optical path length change is:

$$\delta z = \alpha \delta x = \alpha \delta_0 \sin \omega_m t \quad (3)$$

where $\delta_0$ and $\omega_m$ are the amplitude and frequency of the displacement, and $\alpha = \delta z/\delta x = \tan\theta$, is the local slope of the surface. The above equation is a good approximation for small displacements because the path length change caused by the reflection angle difference is negligible. The modulated phase term is then given by:

$$\Phi_m = 4\pi\delta z/\lambda = 4\pi\alpha\delta_0 \sin \omega_m t/\lambda \quad (4)$$

Figure 2A:
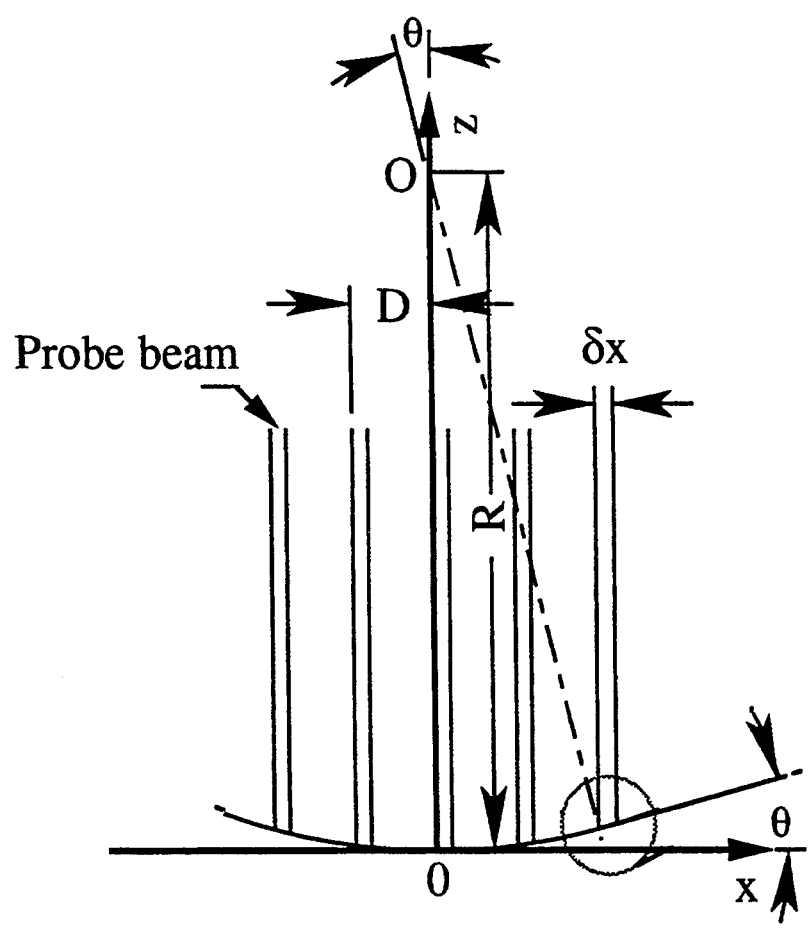
FIG. 2 (a) shows phase modulation caused by lateral vibration of a curved surface.
Figure 2B:
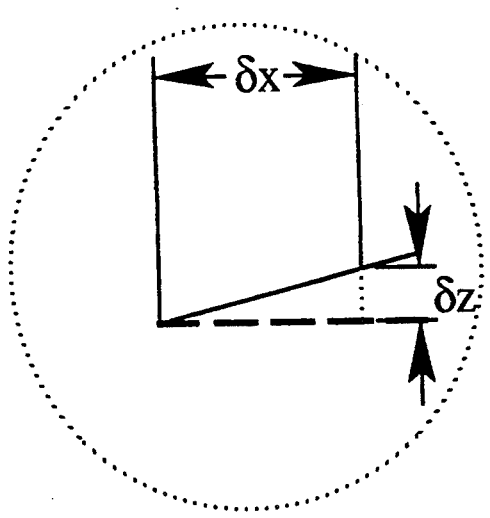

This sinusoidally modulated phase term can be detected by using either a phase locked loop or discriminator. After a high pass filter, the RF signal from the photodiode is mixed with a RF local oscillator derived from a voltage controlled oscillator (VCO). The intermediate frequency output from the mixer passes through a loop filter and is used as an error signal to drive the VCO. The VCO is frequency locked to the RF input signal and the time variation of the phase term can be measured from the VCO driving signal. Since this scheme is not sensitive to a quasi-static phase change, it does not require feedback control of the optical path length of the interferometer. Moreover, since the signal from the phase locked loop is synchronously detected by a lock-in amplifier, any unsynchronized background disturbance of the interferometer is filtered out. The sensitivity of a heterodyne interferometer is well known. If a temporally and spatially coherent source is used, then the minimum detectable phase difference between the two interferometer arms is:

$$\Delta\phi_{min} = \sqrt{(h\nu\Delta f/24\eta P)} \quad (5)$$

where $P/h\nu\eta$, $\Delta f$, and $\eta$ represent the number of photons, detection bandwidth, and quantum efficiency of the photodiode, respectively. The sensitivity calculation has been performed by assuming: i) 50% conversion efficiency of the acousto-optic modulator, ii) half of the probe beam is lost at the BS, and iii) there is a 3 dB loss in signal at the RF mixing stage. For a 1 mW He-Ne laser and silicon photodiode ($\eta \sim 0.8$), the minimum detectable phase difference is $\Delta\Phi_{min} \sim 5 \times 10^{-7}$ rad$\sqrt{\{Hz\}}$, or equivalently $\Delta l_{min} = 2.5 \times 10^{-14}$ m$\sqrt{Hz}$. The equivalent noise bandwidth has been determined by the integration time constant of the lock-in amplifier. For a 10 millisecond time constant, $\Delta f = 1/(8\tau) = 12.5$ Hz. With these parameters, the theoretical limit of the average differential depth resolution is $\Delta l_{min} = 8.8 \times 10^{-14}$ m. A complete map of the local slope of a test sample can be determined by scanning the probe over the surface, and the surface structure can be regenerated from this map. The test sample can be mounted on a PZT driven stage that in turn can be mounted on a motor driven X-Y stage. The X-Y stage and the lock-in amplifier can be interfaced with a personal computer (PC) as shown in FIG. 1. While scanning the sample over the region of interest, the local slope at each data point is obtained by a standard numerical integration method, see FIG. 2 for illustration of this technique.

Figure 3:
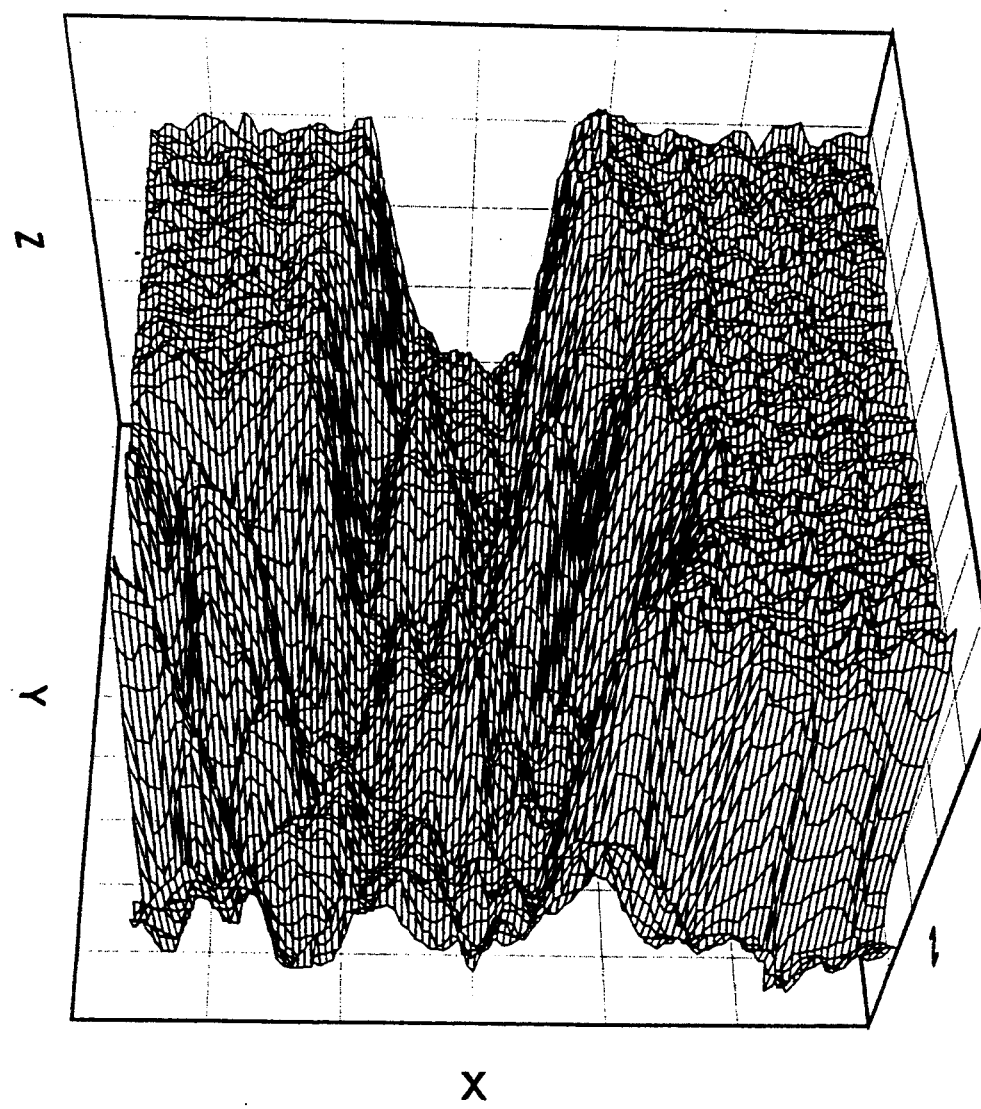
FIG. 3 shows a low resolution SCSM image of a scratched and indented region on an aluminum coated mirror.
Figure 4:
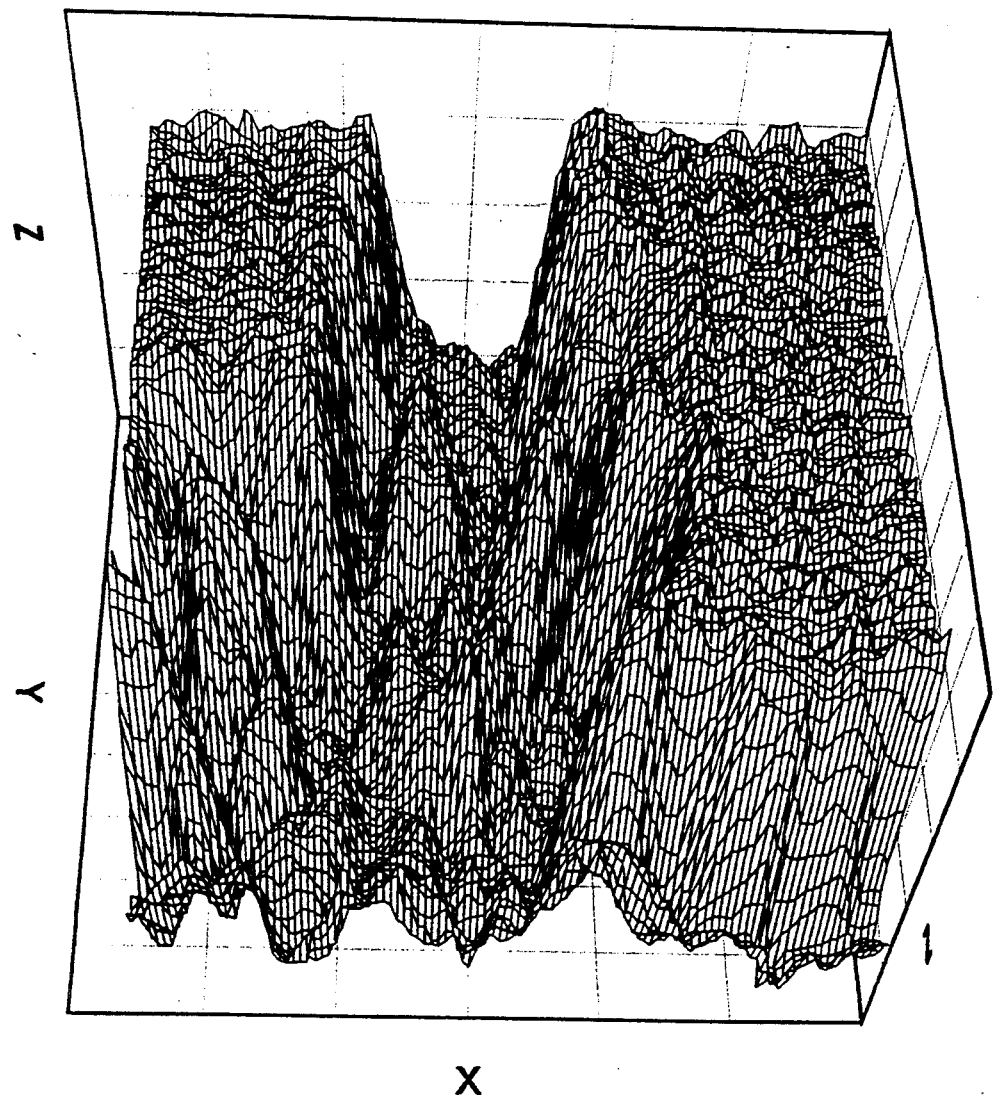
FIG. 4 shows a high resolution SDSM image of a cross-shaped scratch mark on an aluminum coated mirror.

FIG. 3 shows a scan of an aluminum mirror surface on which a cross-shaped scratch and a series of point indentations were deliberately made. A high resolution SCSM image of the cross is shown in FIG. 4. Although in its present form SCSM cannot compete with SEM in lateral resolution, its average depth resolution is much better and depth profiles viewed at different angles are obtained directly. Moreover, the SCSM is non-destructive since it does not require a conducting surface, and the sample does not need to be sliced to quantify the depth of the image.

It should be noted that the SCSM results shown in FIGS. 3 and 4 are 2-D maps of 1-D slope data. Although these maps show qualitative features of the surface, in order to obtain quantitative images the slope data need to be converted to a depth profile. In FIGS. 3 and 4 the slope data was obtained unidirectionally and the data was not calibrated for scattering loss of the probe beam on the scratch. Such scattering loss on the scratch can be compensated by adding an automatic RF gain control stage, and a two dimensional slope vector can be obtained by adding another PZT translation stage that provides lateral vibration in an orthogonal direction.

This invention also uses a heterodyne interferometer for surface diagnostics. The interferometer has been designed to measure the local slope of a surface. Using this technique we have been able to image the 3-D surface structure of various optical components such as lenses and mirrors. SCSM has the following desirable features: i) the microscope is non-destructive; ii) the microscope can produce diffraction-limited 3D images of a surface with an average differential depth resolution $2.5 \times 10^{-14}$ m. With longer scanning times a high resolution image of an entire surface can be obtained. These images can be viewed at different angles with different magnifications using computer graphics so both macroscopic and microscopic diagnostics can be performed on the same data set.

The scanning speed of the current arrangement was determined by the motor driven X-Y stage. With these stages $110 \times 100$ data points were obtained in approximately 5 minutes. The scanning time can be significantly reduced by using a long travel PZT driven stage. The scanning speed is then determined by the integration time constant of a lock-in amplifier.

A high resolution SCSM image of a cross-shaped scratch mark on an aluminum coated mirror. FIG. 3 shows the 1-D variation of the local slope of a UV grade lens (f=25 cm) obtained in this way. The probe beam was focused on the front surface of the lens, and the slope map of the surface was obtained over a $1 \times 1$ mm$^2$ area of the surface. The spacing between data points was approximately 1 $\mu$m. The surface profile image was produced from the slope data by integrating the X-directional scan data. Since the surface is vibrated in one direction only, the reconstructed lens surface looks cylindrical. A complete spherical surface image can be obtained from the 2-D slope data at each starting point of the X-directional scan. The 2-D slope vector can easily be obtained by using a computer-interfaced, PZT driven X-Y stage. Since the vector slope is needed only at the starting point of the scan, no significant delay in scanning speed occurs. As shown in the FIG. 3, both the spatial map of the curved surface and its local roughness are clearly evident. In other techniques, macroscopic and microscopic profiles cannot be determined at the same time without replacing the probe. For example, the radius of curvature of a curved surface can be determined by Talbot interferometry. However, this technique is not appropriate for quantifying local defects of the surface with diffraction limited spatial resolution. SCSM image of a UV grade lens (f=25 cm). This is a map of the one dimensional slope.

Coherent Hybrid Fiber-Optic Probe For Mapping Induced Birefringence in GaAs Structures As another embodiment of the invention, a very sensitive fiber interferometric sensor for remote mapping of electro-optically induced birefringence in GaAs as well as other materials is provided below. This interferometer can be used to analyze and characterize GaAs structures without the need for elaborate testing equipment and procedures. The achieved spatial resolution is on the order of 0.5 $\mu$m. It is well known that GaAs has a large electro-optic (EO) coefficient. Therefore, GaAs integrated circuits and devices can be probed optically through the electro-optically induced birefringence produced by steady or transient voltages in the circuit. For example, non-invasive electro-optic sampling of microwave circuits is useful for measuring electrical waveforms propagating on a GaAs substrate. Previously, GaAs circuits had been tested by using a transmission line formed on an electro-optic substrate. EO crystals placed close to the device under test can be sampled with a beam that probed the crystal to measure the fringing fields of the transmission line. Unfortunately, this technique has limitations since the transmission line and crystal disturb the fields in the device under test. Techniques for non-perturbing, in-situ measurements are more desirable since an external crystal is not required. The invention extends the sensitivity and flexibility of electro-optic probing of GaAs structures through the use of a single-mode fiber probe that allows high resolution, remote mapping of induced birefringence in electro-optically active materials. These techniques allow one to map the local electric field in GaAs circuits. The electric field induced birefringence patterns mapped by the probe can be used to spatially monitor other parameters such as doping density, carrier concentration, etc. Also, this probe can be used to uncover processing defects that would otherwise not be evident in conventional scanning electron microscope (SEM) imagery. Induced birefringence can be monitored with high sensitivity by the use of coherent interferometry. Typically in such techniques, double beam interferometers such as the Mach-Zehnder are used in which two separate beams are derived from a single coherent source. The relative phase difference between these two beams can be detected by recombining them at a beam splitter and detecting concomitant intensity changes. The detection sensitivity of such arrangements is limited only by photon noise if a sufficiently coherent light source is used. Practical, convenient interferometers can be built with fiber optic components, although better sensitivity can be obtained in a free space interferometer because an optical fiber is more susceptible to environmental noise. If two independent fiber arms are used in the interferometer, then local environmental disturbances will effect both fibers independently leading to increased background noise. In an optical fiber interferometer complete signal fading can also occur because of polarization state drift in the fiber. Optical fibers tend are usually birefringent and small mechanical stresses, bending, and twisting of a fiber can induce linear and circular birefringence. The state of polarization (SOP) of a laser beam in such a fiber is subject to the induced birefringence. When the interferometer arms involve two independent fibers, the SOP's of returning beams may not be the same and complete signal fading can occur. However, an optical fiber interferometer does have several advantages: i) compact arrangements are possible, ii) it does not require tedious alignment between measurements, and iii) the probe light can be easily routed to the sample under test, i.e. remote sensing ability. Such versatility is essential for real time diagnostics.

Figure 5:
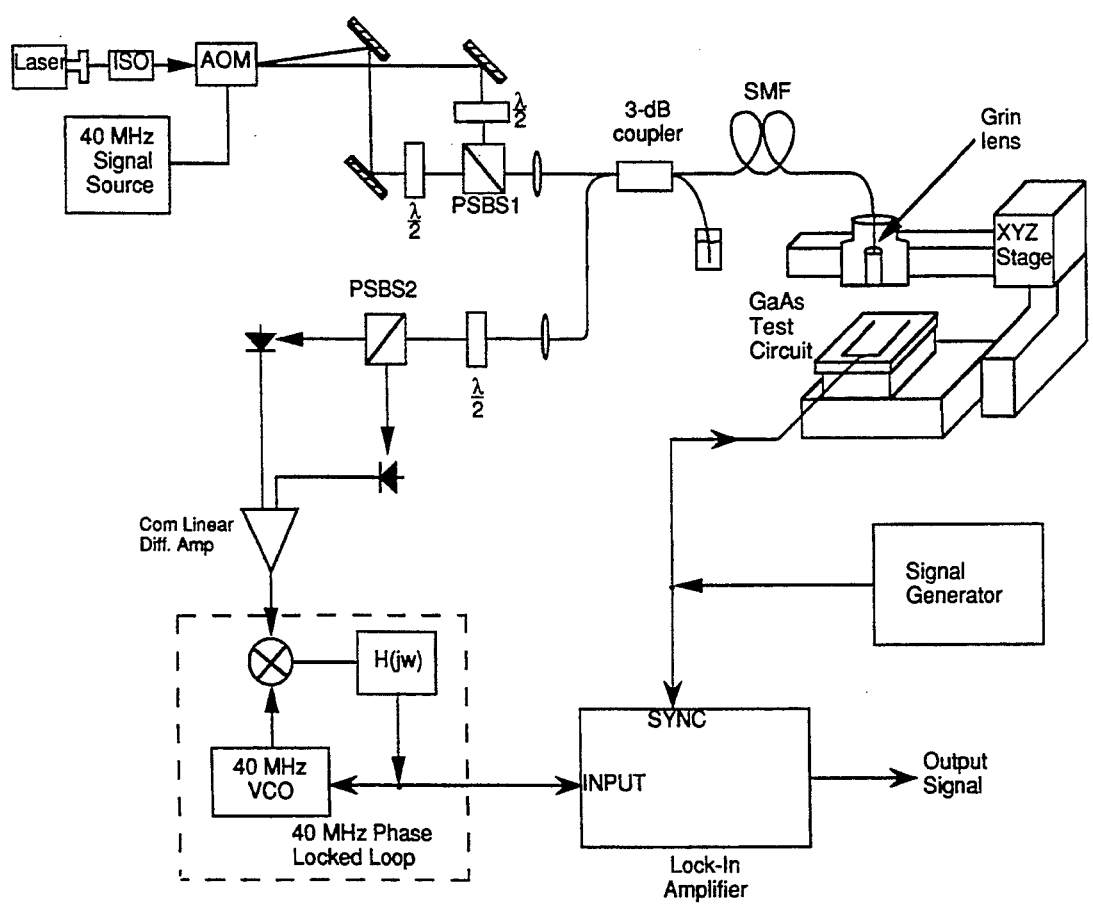
FIG. 5 shows another embodiment of the apparatus using a birefringent probe arrangement.

Linear birefringence caused by the electro-optic effect can be measured coherently with a conventional interferometer. However, in order to minimize phase and polarization drifts that occur when independent signal and reference arms are used, combining two orthogonally polarized beams into a single fiber to minimize common-mode effects is performed. The birefringence of a GaAs sample will induce a phase shift between these orthogonally polarized beams where each polarization component can be regarded as belonging to an arm of a conventional interferometer. A polarization sensitive beam splitter can be used to demodulate the phase retardation on the beams. Since any fiber perturbation will affect both beams in the fiber, the system is relatively invulnerable to environmental effects, and common mode signals can be suppressed in the detection electronics. In addition, to avoid operating point drift that plagues synchronous detection schemes, one can use a true heterodyne scheme in which the two orthogonally polarized beams are at different frequencies. Illustration of the fiber sensor is shown in FIG. 5 where ISO is an optical isolator, AOM is an acousto-optic modulator, PSBS is a polarization sensitive beam splitter, SMF is a single node fiber, VCO is a voltage controlled oscillator. A 35 mW 1.3 μm Nd:YAG laser is used as the signal source. A monolithic ring laser (Lightwave Technology Model 120-03) can be used since it is recognized as an ideal light source for an interferometric sensor because of its narrow line width and small amplitude noise. GaAs is also transparent at the laser output wavelength of 1.3 μm. The beam is optically isolated and passes through a 40 MHz acousto-optic modulator (AOM) that produces two beams, one of which is shifted in frequency by 40 MHz from the fundamental. The plane of polarization of one of the beams is rotated 90° with respect to the other before entering polarizing beam splitter PSBS1. The two beams are combined in PSBS1 to yield two copropogating, orthogonally polarized beams. These beams are injected into a single mode fiber and pass through a 3 dB coupler. One of the coupler output beams is dumped into index matching fluid, while the other output beam continues to the sensing end. A 0.29 pitch graded index (GRIN) lens is epoxied to the end of the fiber with a focal point 5 mm. from the GRIN lens. The GRIN is positioned above the GaAs sample at a height that gives maximum collection of the reflected beam. A computer controls an XYZ positioner that scans the GRIN above the GaAs device. The local electric field in the GaAs modulates the birefringence of the substrate and induces a phase shift between the orthogonal components of the probe beam. The beam is reflected back into the fiber and returns through the 3 dB coupler, a half wavelength waveplate, and polarizing beamsplitter PSBS2 before reaching the detection photodiodes. The phase shift induced by the GaAs is detected by placing the output beam splitter (PSBS2) at 45° to the principal linear polarization directions, so that the two orthogonal components of the beam mix. Final detection occurs at balanced mixer using two wideband photodiodes. Common mode amplitude noise is suppressed by differentially amplifying the signals from these two photodiodes. The diode output currents in FIG. 5 are:

$$i_{1,2} \approx \{|E_{\omega'}|^2 + |E_\omega^2 \pm 2|E_\omega||E_{\omega'}|\cos(\Delta\omega t + \Delta\Phi_s - \Phi_1)\} \quad (6)$$

The signals are combined in an RF differential amplifier to minimize amplitude noise, yielding:

$$I_{diff} \approx \cos(\Delta\omega t + \Delta\Phi_s - \Phi_m) \quad (7)$$

where $\Delta\omega = \omega - \omega'$ is the AOM excitation frequency, $\Phi_m$ is the induced phase shift, and $\Delta\Phi_s$ is the static phase term. Thus, the phase modulation on the optical carrier has been down converted to an RF frequency. The induced phase $\Phi_m$ can be detected by using standard RF demodulation techniques. Typically, in RF homodyne detection, a portion of the AOM drive is mixed with the detector output to beat the RF signal down to base band. For optimum detection, this method requires active RF phase control to maintain quadrature $\Delta\Phi_s = (2n+1)\pi/2$ between the interferometer output and the AOM drive. Conversely, in RF heterodyne detection the sinusoidal signal modulation in $\Phi_m$ is directly detected in the phase locked loop (PLL) stage. The $\Delta\Phi_s$ term above represents a static phase shift due to differing path lengths, thermal expansion and contraction of the optical components, and other slowly varying effects. Heterodyne detection is immune to these pseudo-static phase perturbations since the PLL automatically tracks the static phase, unlike a homodyne detection schemes which can also be used in this embodiment. Furthermore, direct PLL detection does not require a stable source since the voltage controlled oscillator is locked to the carrier. Although other schemes exist for heterodyne detection, they often require complicated techniques and are usually not as sensitive as true heterodyne methods. A discriminator can be used in this embodiment of the invention. The simplicity of the detection electronics using the direct PLL method is evident from FIG. 5. The phase modulation is detected in a discrete 40 MHz PLL employing an automatic gain control (AGC) stage, doubly balanced mixer, 40 MHz VCO, and an active loop filter. Phase demodulation is achieved by mixing the differential amplifier output with the VCO output. The mixer output is filtered and is used to derive the VCO control voltage that keeps the VCO frequency and phase locked to the incoming RF carrier. The VCO control voltage also contains the demodulated phase signal, which is further amplified before the output signal is displayed on an oscilloscope or dynamic signal analyzer. This detection scheme is elegant and does not require any specialized or expensive components, making the sensor desirable for commercial applications. GaAs belongs to symmetry group 43m its linear electro-optic tensor is:

$$r_{mk} = \begin{pmatrix} 0 & 0 & 0 \\ 0 & 0 & 0 \\ 0 & 0 & 0 \\ r_{41} & 0 & 0 \\ 0 & r_{41} & 0 \\ 0 & 0 & r_{41} \end{pmatrix} \quad (8)$$

In a principal axis system the indicatrix is:

$$(x^2+y^2+z^2)/n_o^2 + 2r_{41}(E_x yz + E_y zx + E_z xy) = 1. \quad (9)$$

If the electric field is applied along the x direction, then $$(x^2+y^2)/n_o^2 + 2r_{41}E_x yz = 1, \quad (10)$$

which has new principal axes y' and z' at 45 degrees with respect to the original y and z. The corresponding indices are:

$$n_{y'} = n_o + (n_o^3 \, r_{41} E_x(x))/2 \quad (11)$$

$$n_{z'} = n_o - (n_o^3 \, r_{41} E_x(x))/2. \quad (12)$$

Figure 6:
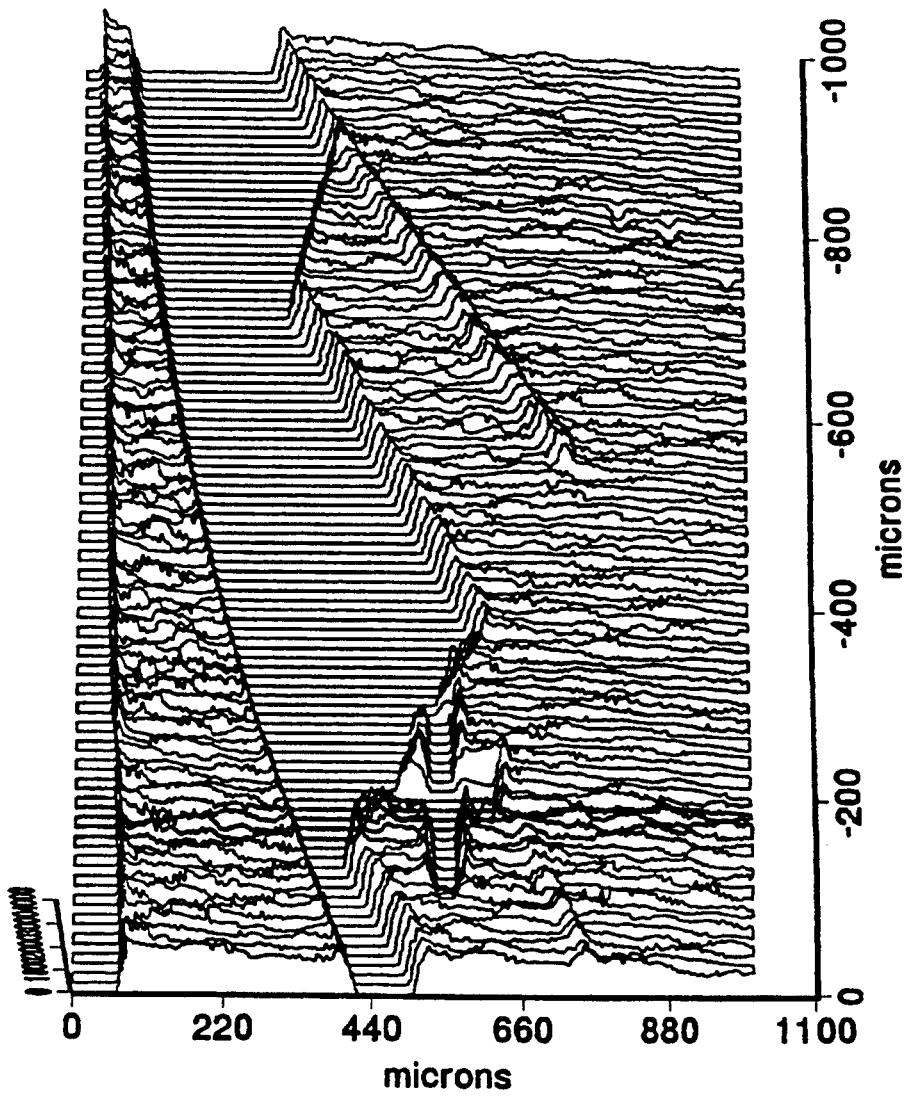
FIG. 6 shows a birefringence probe scan result of a GaAs object sample.
Figure 7:
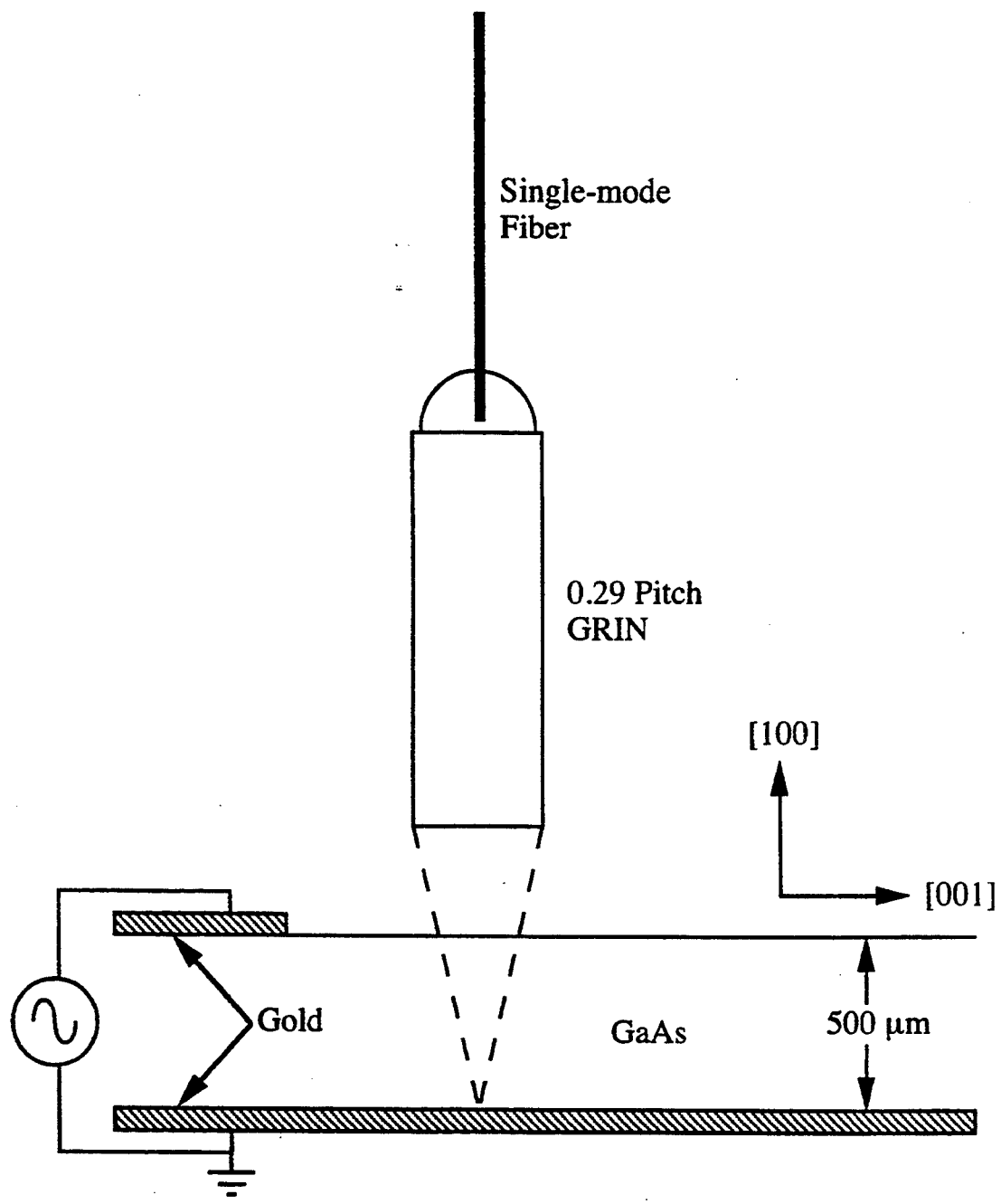
FIG. 7 shows a side view of a GaAs coplanar strip line showing probe beam orientation and crystal orientation. Circuit traces on top are gold, and the polished bottom surface has a gold coating.
Figure 8A:
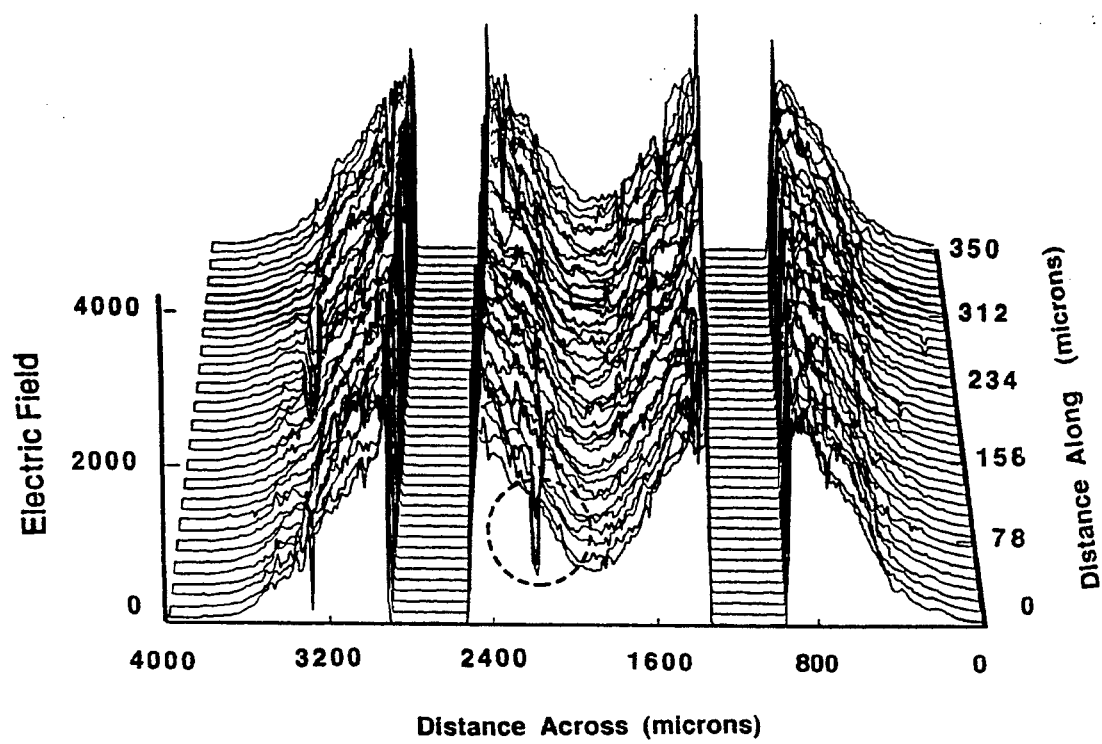
FIG. 8(a) shows birefringence probe scan result for a GaAs coplanar strip line structure.
Figure 8B:
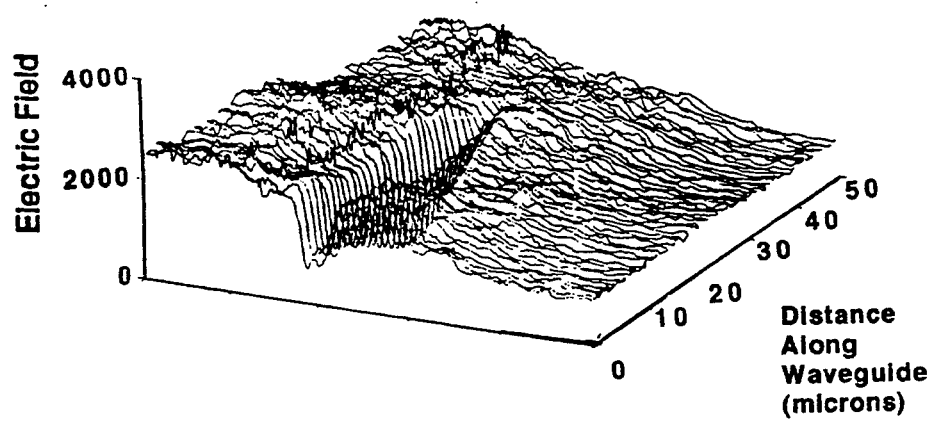
FIG. 8(b) shows fine details in the scan that correspond to real features in the structure from the high resolution scans of dotted circle area.

Therefore, only the x component of the electric field contributes to the birefringence. The resultant phase retardation for light after reflecting off the back surface of a GaAs sample is:

$$\Gamma = 2\pi(n_o^3 r_{41} V)/\lambda, \quad (12)$$

where V is the applied voltage. The sensitivity can be calculated using equ.(12). For example, when 5 Volts is applied to a wafer with a thickness of 500 μm, the output signal is 45 dBV²/√Hz above the noise floor in the spectrum analyzer trace. The unity SNR sensitivity calculated from these values after the spectrum analyzer bandwidth is taken into account is approximately 20 microradians/√Hz. Sensitivities in this range are obtainable using a similar interferometric arrangement with a He-Ne laser. Several GaAs devices can effectively be used with this probe for detecting features that would otherwise not be evident. With this orientation the probe beam travels in the vertical plane, which gives maximum sensitivity to the electro-optic effect. For example, with the test structure that is shown in FIG. 6, the birefringence scan results on the right show that the gold features of the structure are exactly reproduced. The signal drops to zero on the gold features of the structure since the beam is reflected, and the maximum signal is observed adjacent to the gold features since the fringing field component in the z direction is maximum. Also, circuit features that could be overlooked in the SEM image standout in the probe results. For example, there is a small gold stripe above and to the right of the alignment (+) mark. This can be clearly seen in the probe scan results and is barely discernible in the SEM image. To show the probe's usefulness as a diagnostic tool, a coplanar strip line was scanned for illustration. A side view of the GaAs structure in FIG. 7 shows the optical arrangement and GaAs crystal orientation by [100] and [001] as shown. The structure has a mirrored gold coating on the back and gold circuit traces on the top surface. The birefringence of the underlying GaAs varies with distance from the surface traces due to the fringing fields that terminate on the ground plane underneath. The scan results are shown in FIG. 8(a) and 8(b), a blow-up of the dashed circle as shown in FIG. 8(b). There is a great deal of reproducible fine detail in the scan. This fine detail is the real variation in the degree of local birefringence anisotropy of the surface. To demonstrate the reproducible nature of the fine structure in FIG. 8(a) and 8(b), a high resolution scan of the circled region is shown in FIG. 8 (b). Fine variation of the birefringence anisotropy can result from inhomogeneities in doping density, crystal defects, failure to completely remove metal overlays during processing, or other processing defects. Fine variation in scans does not result from variation in the substrate thickness, since the signal from the probe depends on voltage acting across the substrate, not the local electric field. This shows that the probe can be used to obtain images showing general features followed by high resolution scans of the most interesting regions.

Figure 9:
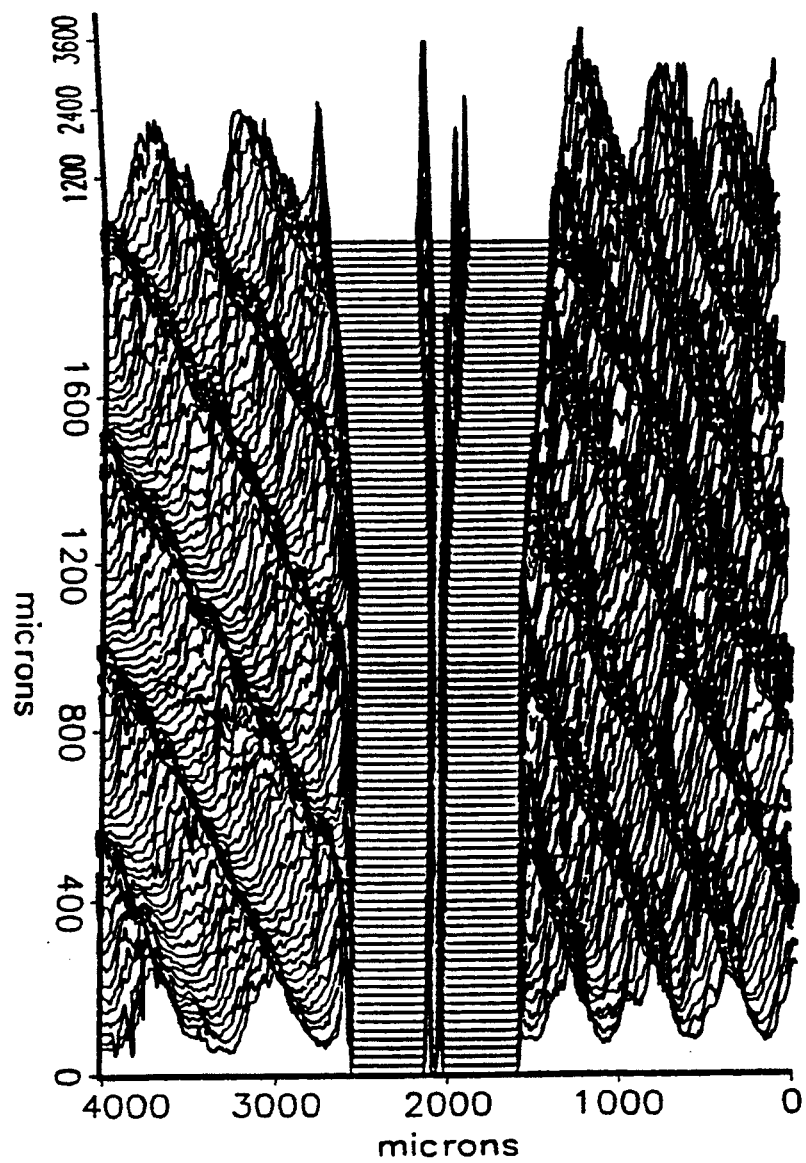
FIG. 9 shows a birefringence probe scan result for a test structure showing conductive pattern left on the substrate from an incomplete processing step of the sample being tested.

Another structure tested with the probe is shown in FIG. 9. In this illustration, the fringing electric field near gold features did not decay as expected, and there is a periodic structure evident in the results. This can be explained if there is any conducting pattern left on the substrate after processing. On further investigation we also noticed that the RF carrier level moved in anti-correlation to the detected phase shift. These observations can be explained if any of the p+ epi-layer remains after the processing steps. The carrier level would drop due to increased surface reflection in the epi-layer. However, the detected signal level increases when probing an epi-layer since the beam that penetrates sees a strong x-directed electric field. The presence of residual epi material would also explain why the electric field is maintained all the way to the edge of the substrate. An SEM image of the structure shows no observable features outside the gold stripes. Such birefringence imagery can be useful in identifying potential problems in device processing and identifying subtle defects that affect device performance. Spatial resolution is approximately 0.5 μm. This slightly better than diffraction limited resolution results from the effective confocal nature of the light delivery and re-collection by the single mode fiber.

Coherent Fiber Probe for Monitoring the Electrical Activity of Biological Cells

The tapered tip probe described above in examining the qualities of GaAs structures can similarly be used to examine the membrane of electrically active biological cells since cells also exhibit birefringent qualities. The probe as shown in FIG. 5 can have in place of the GaAs sample a living biological cellular sample which would be near the end of the fiber. A GRIN lens focuses light near the cellular sample's membrane whose natural birefringence affects the reflected signal allowing monitoring of electrical activity. Electrodes from a signal generator as shown in FIG. 7 can be attached to the cellular sample such that stimulated electrical excitation can occur. Medical applications of the basic apparatus include electrocardiograms (ECG), monitoring neural activity in the human body such as in the brain or neural fibers. The inherent advantages using the instant invention in biological applications includes allowance for real-time monitoring applications without the use of dyes in a non-contact and non-invasive way.

OTHER EMBODIMENTS

The laser beam in a coherent vibrating surface profiler can be directed in free space at the object under examination, sent along fibers with integral focusing at their far ends, or directed down fibers that have a sub-optical wavelength tip, tapered fiber to provide sub-optical-difraction-limited resolution.

The probe can be use either heterodyne or homodyne demodulation schemes.

Alternate interferometric schemes can be used for the coherent detection of the laser beam Doppler shifted at the vibrating object: Michelson, Mach-Zehnder or Jamin.

The phase-locked loop electronic demodulation circuitry in the birefringence detection apparatus as shown in FIG. 5 can be replaced with homodyne based demodulation circuitry to provide high sensitivity measurements.

Although the description above contains many specificities, these should not be construed as limiting the scope of this invention but as merely providing illustrations of some of the presently preferred embodiments of this invention.

I claim:

1. A non-contact and non-destructive high-resolution three-dimensional scanning surface profile measuring apparatus of an object sample utilizing optical interferometry comprising:

a laser source for emitting a laser beam;

a light focusing means for converging the laser beam on the surface of the object sample, the laser beam being scattered from the surface of the object sample while being provided with information on the surface profile of the object sample;

interfering means for allowing the reflected beam from the object sample to interfere with a reference beam using a means for phase-locked loop demodulation;

surface profile measurement means for measuring the surface profile of the object sample on the basis of an amplitude and a phase variation of interference measurements of the scattered beam and the reference beam;

driving means for moving the object sample relative to the light focusing means in lateral directions normal to the direction of the optical axis of the laser beam incident on the surface of the object sample whereby measurements of the surface profile measuring means at various points on the object sample is determined by the geometrical average of the path-length over a focused region on the object sample; and control means for: i) positioning the object sample under the light focusing means and ii) controlling the driving means based on a signal amplitude and a phase of the reflected beam and the reference beam.

2. The surface profile measuring apparatus of claim 1 wherein the light focusing means for converging the laser beam on the surface of the object sample through a free space assembly of focusing optical means.

3. The surface profile measuring apparatus of claim 1 wherein the light focusing means for converging the laser beam on the surface of the object sample through a single-mode optical fiber with a GRIN lens that focuses the laser light onto the sample object.

4. The surface profile measuring apparatus of claim 1 wherein the light focusing means for converging the laser beam on the surface of the object sample through a single-mode fiber with a tapered tip whereby evanescent near field probing of the object sample can be achieved with sub-diffraction-limited resolution.

5. The surface profile measuring apparatus of claim 1 wherein the surface profile detection means for measuring the surface profile of the object sample on the basis of phase variation of interference measurements of the reflected beam and the reference beam is a homodyne scheme of detection resulting in high sensitivity.

6. The surface profile measuring apparatus of claim 1 wherein the surface profile detection means for measuring the surface profile of the object sample on the basis of phase variation of interference measurements of the reflected beam and the reference beam is a heterodyne scheme of detection resulting in a large operational dynamic range with minimum operating point ambiguity.

7. The surface profile measuring apparatus of claim 1 wherein the control means includes computer processing means whereby on-line computer processing of a surface profile map of the object sample is achieved.

8. The surface profile measuring apparatus of claim 1 wherein the driving means is a piezo-electric transducer.

9. The surface profile measuring apparatus of claim 1 wherein the measuring apparatus is a scanning evanescent field microscope with a tapered fiber tip using an optical fiber from from the laser source.

10. The surface profile measuring apparatus of claim 1 wherein the driving means vibrates the object sample in both the lateral direction and a perpendicular direction whereby better position control results.

11. The surface profile measuring apparatus of claim 1 wherein the surface profile measurement means includes demodulation electronics that converts variations in interference to electrical signals that are processed to give a surface profile of the object sample.

12. The surface profile measuring apparatus of claim 11 wherein the demodulation electronics is a phase-locked loop.

13. The surface profile measuring apparatus of claim 11 wherein the demodulation electronics is a discriminator.

14. A fiber interferometric sensor for remote mapping of electro-optically induced birefringence in a selected material comprising:

a laser source for emitting a laser beam;

a light focusing means for converging the laser beam on the surface of the selected material, the laser beam being reflected from the surface of the selected material while being provided with information on the electro-optically induced birefringence of the selected material;

interfering means for allowing the reflected beam from the selected material to interfere with a reference beam using a means for phase-locked loop demodulation;

excitation means for imposing a voltage signal on the selected material on the basis of an amplitude and a phase variation of interference measurements of the reflected beam and the reference beam;

driving means for moving the selected material relative to the light focusing means in lateral directions normal to the direction of the optical axis of the laser beam incident on the surface of the selected material whereby means for birefringent measuring at various points on the selected material is provided; and control means for: i) positioning the selected material under the light focusing means and ii) controlling the excitation means based on a signal amplitude and a phase of the reflected beam and the reference beam.

15. The fiber interferometric sensor of claim 14 wherein the light focusing means for converging the laser beam on the surface of the selected material through a single-mode optical fiber is a GRIN lens.

16. The fiber interferometric sensor of claim 14 wherein the selected material is selected from the group consisting of: GaAs, InGaAsP and InGaAs.

17. The fiber interferometric sensor of claim 14 wherein the control means for controlling the excitation means is an audio signal synthesizer that generates an electric field in the selected material.

18. The fiber interferometric sensor of claim 14 wherein the excitation means includes demodulation electronics that converts variations in interference to electrical signals that are processed to give a birefringence profile of the selected material.

19. The fiber interferometric sensor of claim 18 wherein the demodulation electronics is a phase-locked loop.

20. The fiber interferometric sensor of claim 18 wherein the demodulation electronics is a discriminator.

21. The fiber interferometric sensor of claim 14 wherein the selected material is biological cellular tissue with natural birefringent qualities such that the excitation means can stimulate the cellular tissue.

22. A method of determining a surface profile of a three dimensional object sample's surface using an ultrahigh resolution scanning interferometer microscope apparatus with computing means using near field detection schemes comprising the steps of:
 (a) placing the object sample on a driver means for displacing the sample laterally with respect to an incident focused light from a light source that is part of the apparatus;
 (b) vibrating the object sample both i) perpendicularly and ii) laterally at different frequencies relative to the incident focused light whereby two distinct Doppler shifts of a backscattered light from the object sample's surface are obtained that provides data of: 1) a local slope of the object sample surface and 2) a relative distance between the light source and the object sample's surface for position control of the object sample relative to the light source; and
 (c) determining the three dimensional shape from the data acquired in step (b) using standard numerical techniques.

23. The method of claim 22 wherein in step (a), the object sample is laterally displaced by the driver means in a continuous raster scan mode of operation.

24. The method of claim 22 wherein in step (a), the object sample is laterally displaced in a step-wise raster scan mode of operation.

* * * * *